US005305193A

United States Patent [19]

Shinnaka et al.

[11] Patent Number: 5,305,193

[45] Date of Patent: Apr. 19, 1994

[54] ADAPTIVE APPARATUS

[75] Inventors: Shinji Shinnaka, Yokohama; Mikio Sato; Masahiro Morisada, both of Tokyo, all of Japan

[73] Assignee: Canon Kabushiki Kaisha, Tokyo, Japan

[21] Appl. No.: 469,375

[22] Filed: Jan. 24, 1990

[30] Foreign Application Priority Data

Jan. 25, 1989 [JP] Japan .................................... 1-16552
Jan. 25, 1989 [JP] Japan .................................... 1-16553

[51] Int. Cl.$^5$ ........................ G05B 13/02; G06F 15/46

[52] U.S. Cl. .................................... 364/151; 364/148; 364/160

[58] Field of Search ................................ 364/148–151, 364/160–166

[56] References Cited

U.S. PATENT DOCUMENTS

| | | | |
|---|---|---|---|
| 4,358,822 | 11/1982 | Sanchez | 364/164 |
| 4,458,321 | 7/1984 | Whitney et al. | 364/165 |
| 4,674,028 | 6/1987 | Shioya et al. | 364/148 |
| 5,038,269 | 8/1991 | Grimble et al. | 364/148 |

FOREIGN PATENT DOCUMENTS 2042684 4/1971 Fed. Rep. of Germany .
1295109 11/1972 United Kingdom .

OTHER PUBLICATIONS

"Towards A Unified Theory Of Parameter Adaptive Control"; A. S. Morse, Proceedings Of The 27th IEEE Conf. On Decision and Control; Dec., 1988 pp. 745–750.

"A Self-Tuning Method For Smith Predictor And PID Controls"; A Kaya, T. J. Scheib; Advances In Instrumentation, vol. 39, Oct., 1983 Pittsburgh, Pa., pp. 843–845.

*Primary Examiner*—Jerry Smith
*Assistant Examiner*—Thomas E. Brown
*Attorney, Agent, or Firm*—Fitzpatrick, Cella, Harper & Scinto

[57] ABSTRACT

In an adaptive apparatus for adaptively adjusting parameters in a system, the parameters of the system are adjusted in accordance with an integral relationship. At that moment, one or both of a scalar and a matrix which depend on time are used as gains. Furthermore, adjustment in accordance with a proportional relationship is used together. Also in this adjustment, one or both of a scalar and a matrix which depend on time are used as gains.

10 Claims, 8 Drawing Sheets

4
$\hat{\theta}(o)$
$\hat{\theta}(t)$
3
19
s(t)
7
9
8
6
5
e(t)
$\zeta(t)$
12
13
14
$\lambda_2(t)$
11
15
$\Gamma(t)$
$\Gamma(o)$
18
10
17
$\lambda_1(t)$
16

CPU
BUS
IP1
IP2
PMEM
MEM

START
TAKE IN ζ(k) AND e(k)
S1
ADJUSTMENT OF Γ(k+1) IN ACCORDANCE WITH EXPRESSIONS (11') ~ (13')
S2
ADJUSTMENT OF θ̂(k+1) IN ACCORDANCE WITH EXPRESSIONS (10') ~ (13')
S3
END

ADAPTIVE APPARATUS

BACKGROUND OF THE INVENTION

1. Field of the Invention

This invention relates to an adaptive apparatus for adaptively adjusting parameters in a system.

2. Description of the Related Art

As adaptive systems having functions of adaptively adjusting parameters in a system, There are various kinds of adaptive systems having functions of adaptively adjusting parameters in a system, such as an adaptive control system, an adaptive identification system, an adaptive observation system, an adaptive equalization system and the like. For example, U.S. Pat. No. 4,358,822 discloses an adaptive-predictive control system which carries out a multivariable control of the top and bottom compositions as outputs with reflux and steam flow rates as inputs of a distillation column. This patent further mentions another adaptive-predictive control system applied to single-input single-output control of an aircraft where the pitch angle is controlled by elevator position. In these adaptive systems, the following error equation is used for adjusting parameters.

$$e(t) = \zeta^T(t) \cdot \psi(t) = \zeta^T(t) \cdot (\hat{\theta}(t) - \theta) = \zeta^T(t) \cdot \hat{\theta}(t) - s(t). \quad (1)$$

In expression (1) described above, e(t) is a scalar error, $\zeta(t)$ is a usable vector signal, $\theta$ is an unknown vector parameter, $\hat{\theta}(t)$ is an adjustable system parameter as an estimated value of $\theta$, $\psi(t)$ is a parameter error having the relationship of $\psi(t)=\hat{\theta}(t)-\theta$, and s(t) is a usable scalar signal having the relationship of $s(t)=\zeta^T(t)\cdot\theta$.

The adjustable system parameter $\hat{\theta}(t)$ must be adjusted so that the following expression (2) is satisfied:

$$\lim_{t\to\infty} e(t) = 0. \quad (2)$$

In a conventional adaptive apparatus, as an adjusting method for this purpose, there has been used a method in accordance with the following expression (3) in which the product of the scalar error e(t) and the vector signal $\zeta(t)$ is simply normalized to adjust system parameters.

$$\dot{\hat{\theta}}(t) = -\frac{\zeta(t)e(t)}{\zeta^T(t)\zeta(t)}. \quad (3)$$

In another case, there has been used a method in accordance with the following expression (4) in which the product of the scalar error e(t) and the vector signal $\zeta(t)$ is multiplied by a matrix gain $\Gamma$ to adjust system parameters.

$$\dot{\hat{\theta}}(t) = -\Gamma\zeta(t)e(t) \quad (4).$$

Furthermore, in an adaptive system, an error equation such as the following expression (5) may sometimes be used in place of the error equation (1).

$$\epsilon(t) = \zeta^T(t) \cdot (\hat{\theta}_I(t) - \theta) = \zeta^T(t)\hat{\theta}_I(t) - s(t). \quad (5)$$

In expression (5), $\epsilon(t)$ is a scalar error, and an adjustable parameter $\hat{\theta}_I(t)$ is a vector defined by the following expression (6) using a parameter $\hat{\theta}(t)$ conforming to an integral relationship such as expression (3) or (4) and $\theta_P(t)$ conforming to a proportional relationship:

$$\hat{\theta}_I(t)=\hat{\theta}(t)+\hat{\theta}_P(t) \quad (6).$$

The parameter $\hat{\theta}_I(t)$ becomes an adaptive estimation value of $\theta$.

The adjustable system parameter $\hat{\theta}_I(t)$ must in general be adjusted so that the following expression (7) is satisfied:

$$\lim_{t\to\infty} \epsilon(t) = 0. \quad (7)$$

In an conventional adaptive apparatus, as another adaptive method for this purpose, there has been used a method in accordance with the following expressions (8) and (9) in which the product of the scalar error $\epsilon(t)$ and the vector signal $\zeta(t)$ is multiplied by matrix gains $\Gamma$ and $\Gamma_P$ to adjust system parameters:

$$\dot{\hat{\theta}}(t) = -\Gamma\zeta(t)\epsilon(t) \quad (8)$$

$$\hat{\theta}_P(t) = -\Gamma_P\zeta(t)\epsilon(t) \quad (9).$$

However, in the conventional method in which the system parameter $\hat{\theta}(t)$ is adaptively adjusted in accordance with expression (3) described above, the performance of adaptive adjustment is determined when the usable vector signal $\zeta(t)$ and the scalar error e(t) are obtained, as is apparent from the form of the expression.

In the case of conforming to the above-described expression (4), the performance of adaptive adjustment can be increased by changing the setting of the gain, as is apparent from the form of the expression. Similarly, when the system parameters $\hat{\theta}(t)$ and $\hat{\theta}_P(t)$ are adjusted in accordance with expressions (8) and (9), the performance of adaptive adjustment can also be increased by changing the setting of the gain. In such conventional adjusting methods, however, the gain used for adjustment consists of only a fixed matrix gain which is very limited. Hence, it is impossible to perform appropriate adjustment of parameters having high adaptability.

As a result, since the performance of an adaptive system largely depends on an adaptive apparatus for adaptively adjusting system parameters, it has been impossible to construct an adaptive system which provides excellent performance in conventional apparatuses using the adjusting methods of system parameters as described above.

SUMMARY OF THE INVENTION

It is an object of the present invention to provide an adaptive apparatus capable of adjusting parameters in a system with a high accuracy.

It is another object of the present invention to provide an adaptive apparatus for adjusting parameters in a system in accordance with an integral relationship, which has a high degree of freedom for gains to be utilized.

It is still another object of the present invention to provide an adaptive apparatus for adjusting parameters in a system in accordance with an integral relationship and a proportional relationship, which has a high degree of freedom for gains to be utilized in each of the integral relationship and the proportional relationship.

According to one aspect, the present invention which achieves these objectives relates to an adaptive apparatus for adaptively adjusting parameters in a system comprising input means for inputting a signal, adaptive processing means for adaptively processing the signal input by the input means, output means for outputting the signal processed by the adaptive processing means, generation means for generating a usable vector signal from the input signal and the output signal, generation means for generating a usable scalar signal from the input signal and the output signal, derivation means for deriving an error signal from the vector signal, the scalar signal and estimation values for the system parameters, and adjustment means for adjusting the parameters in accordance with an integral relationship using the vector signal, the error signal, and one or both of a scalar gain and a matrix gain which change in time.

According to another aspect, the present invention relates to an adaptive apparatus for adaptively adjusting parameters in a system comprising input means for inputting a signal, adaptive processing means for adaptively processing the signal input from the input means, output means for outputting the signal processed by the adaptive processing means, generation means for generating a usable vector signal from the input signal and the output signal, generation means for generating a usable scalar signal from the input signal and the output signal, derivation means for deriving an error signal from the vector signal, the scalar signal and estimation values for the system parameters, and adjustment means for adjusting the parameters in accordance with an integral relationship and a proportional relationship using the vector signal, the error signal, and one or both of a scalar gain and a matrix gain which change in time.

DESCRIPTION OF THE PREFERRED EMBODIMENTS

Figure 1:
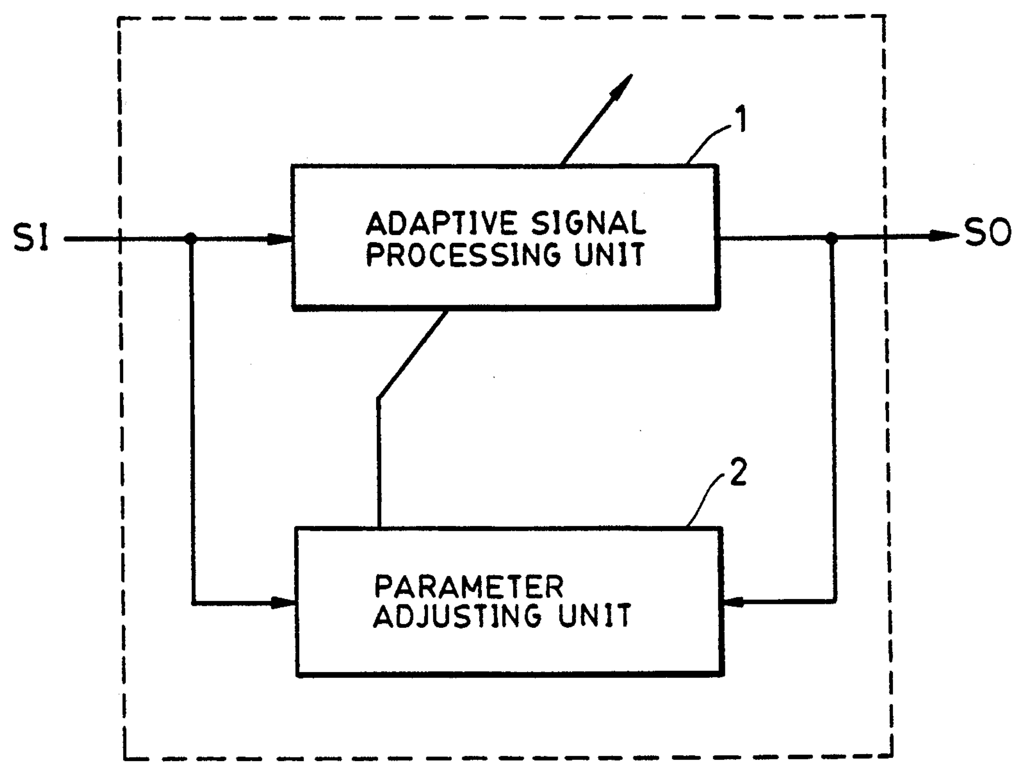
FIG. 1 is a block diagram in a first embodiment of the adaptive apparatus of the present invention.

FIG. 1 is a block diagram showing the configuration of an embodiment of the adaptive apparatus of the present invention. In FIG. 1, an adaptive signal processing unit 1 receives an external input signal SI from a system adaptively processes the signal SI and outputs a control signal SO to the system. A parameter adjusting unit 2 receives the external input signal SI and the output signal SO from the adaptive signal processing unit 1, and adaptively adjusts system parameters. The adaptively adjusted parameters are sent to the adaptive signal processing unit 1, and are utilized for adaptive processing of signals.

Figure 2:
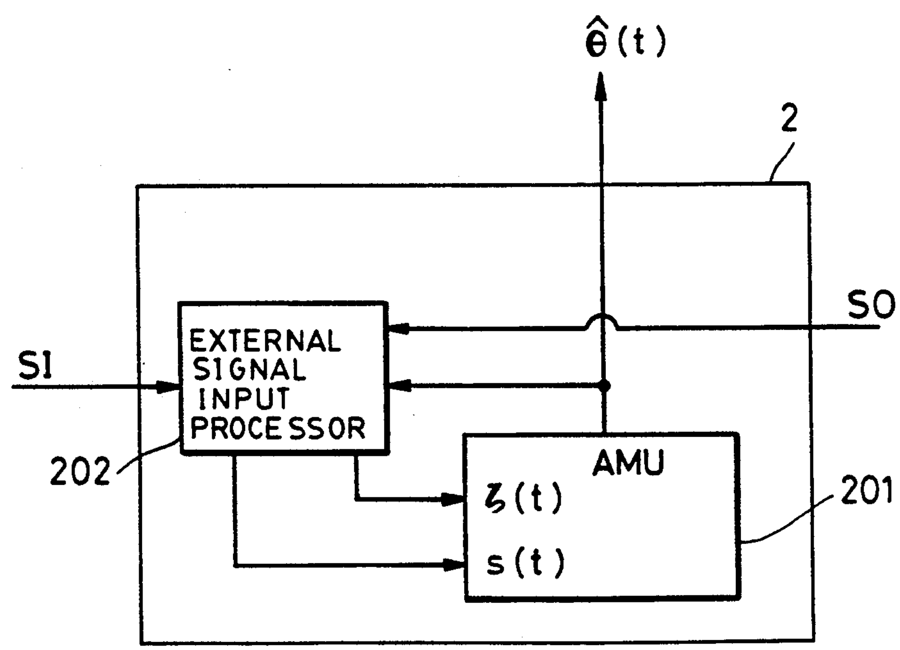
FIG. 2 is a diagram of the internal configuration of a parameter adjusting unit.

FIG. 2 is a diagram of the internal configuration of the parameter adjusting unit 2 shown in FIG. 1. In FIG. 2, an adjusting mechanical unit 201 receives signals $\zeta(t)$ and $s(t)$ from an external signal input processing unit 202, which will be described later, and adaptively adjusts a parameter $\hat{\theta}(t)$. The external signal input processing unit 202 obtains signals $\zeta(t)$ and $s(t)$ used in the adjusting mechanical unit 201 from the signals SI and SO.

Figure 3:
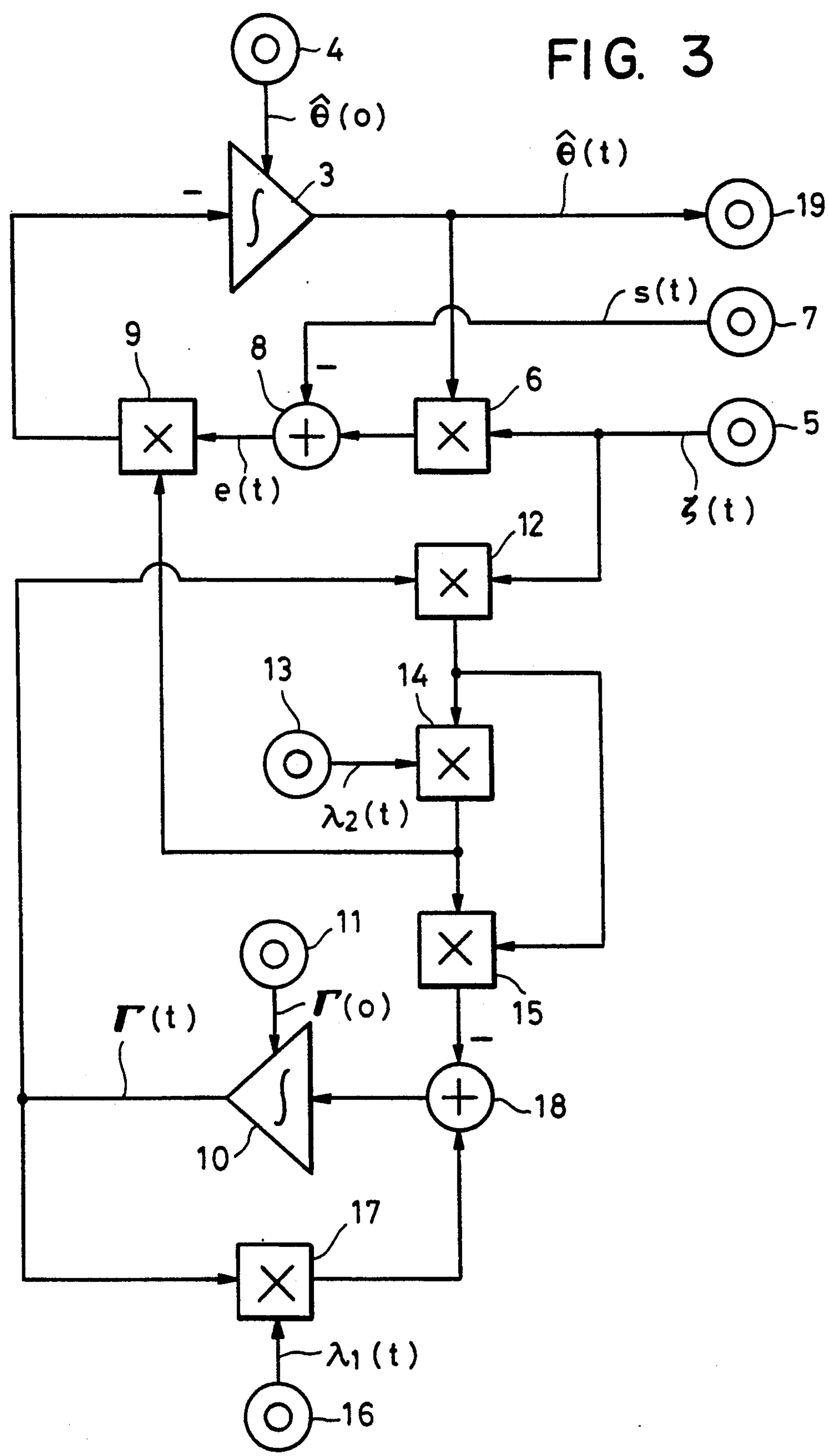
FIG. 3 is a block diagram of a mechanical unit for adjusting parameters.

FIG. 3 shows a central portion of the parameter adjusting unit 2, that is, an example of the block circuit diagram of the adjusting mechanical unit 201 for adaptively adjusting parameters. In FIG. 3, triangular blocks, square blocks and circular blocks indicate integrators, multipliers and adders, respectively. Double circular blocks indicate input or output terminals for signals. An integrator 3 integrates an input value of an adjustable parameter $\hat{\theta}(t)$. A terminal 4 sets an initial value for the integrator 3. An input terminal 5 receives a vector signal $\zeta(t)$ from the external signal input processing unit 202. A multiplier 6 obtains a signal $(\zeta^T(t)\cdot\hat{\theta}(t))$ from $\zeta(t)$ and $\hat{\theta}(t)$. An input terminal 7 receives a signal $s(t)$ from the external signal input processing unit 202. An adder 8 generates an error $e(t)$ from $s(t)$ and $(\zeta^T(t)\cdot\hat{\theta}(t))$. A multiplier 9 multiplies a signal $(\lambda_2(t)\Gamma(t)\zeta(t))$ by the error $e(t)$. An output signal $\lambda_2\Gamma(t)\zeta(t)e(t)$ from the multiplier 9 is inverted and input to the integrator 3.

An integrator 10 integrates an input value of a matrix gain $\Gamma(t)$. A terminal 11 sets an initial value for the integrator 10. A multiplier 12 obtains a signal $(\Gamma(t)\zeta(t))$ from $\Gamma(t)$ and $\zeta(t)$. An input terminal 13 is for a scalar gain $\lambda_2(t)$. A multiplier 14 obtains the signal $\lambda_2(t)\Gamma(t)\zeta(t)$ from $\lambda_2(t)$ and $(\Gamma(t)\zeta(t))$. A multiplier 15 obtains a signal $\lambda_2(t)\Gamma(t)\zeta(t)\zeta^T(t)\Gamma(t)$ from $\lambda_2(t)\Gamma(t)\zeta(t)$ and $\Gamma(t)\zeta(t)$. An input terminal 16 is for a scalar coefficient $\lambda_1(t)$. A multiplier 17 obtains a signal $(\lambda_1(t)\Gamma(t))$ from $\lambda_1(t)$ and $\Gamma(t)$. An adder 18 obtains a signal $(\lambda_1(t)\Gamma(t)-\lambda_2(t)\Gamma(t)\zeta(t)\zeta^T(t)\Gamma(t))$ from $\lambda_1(t)\Gamma(t)$ and $\lambda_2(t)\Gamma(t)\zeta(t)\zeta^T(t)\Gamma(t)$. The output signal from the adder 18 thus obtained is input to the integrator 10. An output terminal 19 outputs the signal $\hat{\theta}(t)$. The adjusting mechanical unit 201 receives signals $\zeta(t)$ and $s(t)$, and outputs the signal $\hat{\theta}(t)$.

The mechanism of parameter adjustment of the present invention has now been explained with reference to block diagrams. The mechanism can be mathematically expressed as follows.

$$\dot{\hat{\theta}}(t) = -\lambda_2(t)\Gamma(t)\zeta(t)e(t) \qquad (10)$$

$$= -\lambda_2(t)\Gamma(t)\zeta(t)(\zeta^T(t)\hat{\theta}(t) - s(t))$$

$$\dot{\Gamma}(t)=\lambda_1(t)\Gamma(t)-\lambda_2(t)\Gamma(t)\zeta(t)\zeta^T(t)\Gamma(t) \qquad (11)$$

$$\Gamma(0)>0,\ \Gamma^{-1}(0)<0, \qquad (12)$$

$$0\leqq\lambda_1(t)<\infty,\ 0<\lambda_2(t)<\infty \qquad (13).$$

Although the conditions expressed in expressions (12) and (13) are not shown in FIG. 3, these conditions are necessary in order to properly adjust the adjustable parameter $\hat{\theta}(t)$.

Figure 4:
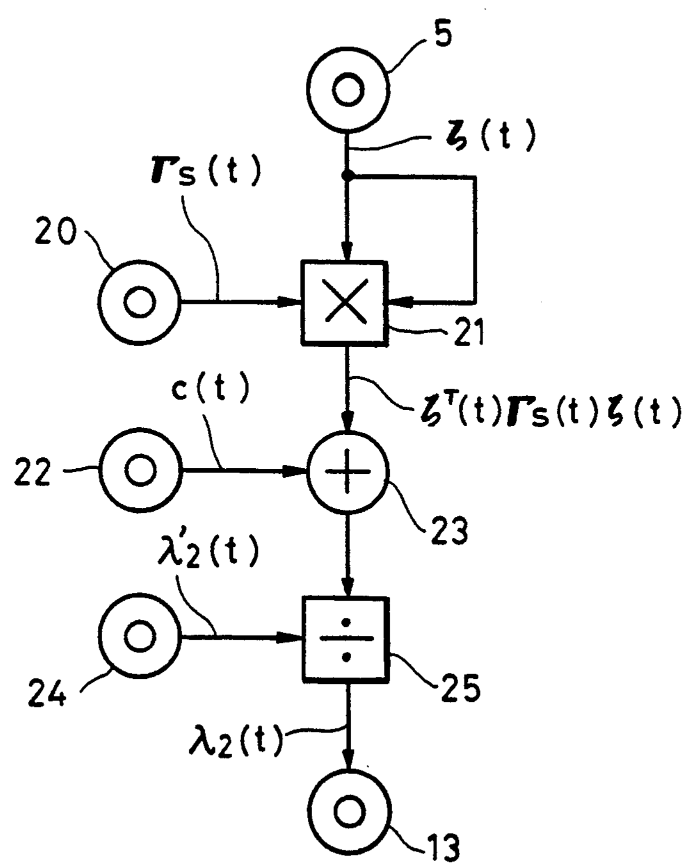
FIG. 4 is a block diagram of a circuit for scaling a scalar gain.

FIG. 4 is a block circuit diagram showing a scaling method for the scalar gain $\lambda_2(t)$. In FIG. 4, there are shown an input terminal 5 for the vector signal $\zeta(t)$, and an input terminal 20 for a matrix gain $\Gamma_s(t)$. A multiplier 21 obtains a signal $\zeta^T(t)\Gamma_s(t)\lambda(t)$ from $\zeta(t)$ and $\Gamma_s(t)$. An input terminal 22 is for signal c(t) which is utilized for scaling. An adder 23 obtains a signal $(c(t)+\zeta^T(t)\Gamma_s(t)\zeta(t))$ from an output signal from the multiplier 21 and the signal c(t). An input terminal 24 is for a scalar gain $\lambda_2'(t)$ which is an object of scaling. A divider obtains the scalar gain $\lambda_2(t)$ which is subjected to scaling from $(c(t)+\zeta^T(t)\Gamma_s(t)\zeta(t))$ and $\lambda_2'(t)$.

A method of scaling of the scalar gain $\lambda_2(t)$ has now been explained with reference to the block circuit diagram. This method can be mathematically expressed as follows.

$$\bar{\lambda}_2(t) = \frac{\lambda_2'(t)}{C(t) + \zeta^T(t)\Gamma_s(t)\zeta(t)} \tag{14}$$

$$\Gamma_s(t) > 0,\ \Gamma_s^{-1}(t) > 0 \tag{15}$$

$$0 \leqq C(t) < \infty,\ 0 < \lambda_2'(t) < \infty. \tag{16}$$

Although the conditions expressed in expressions (15) and (16) are not shown in FIG. 4, these conditions are necessary for scaling.

Figure 5:
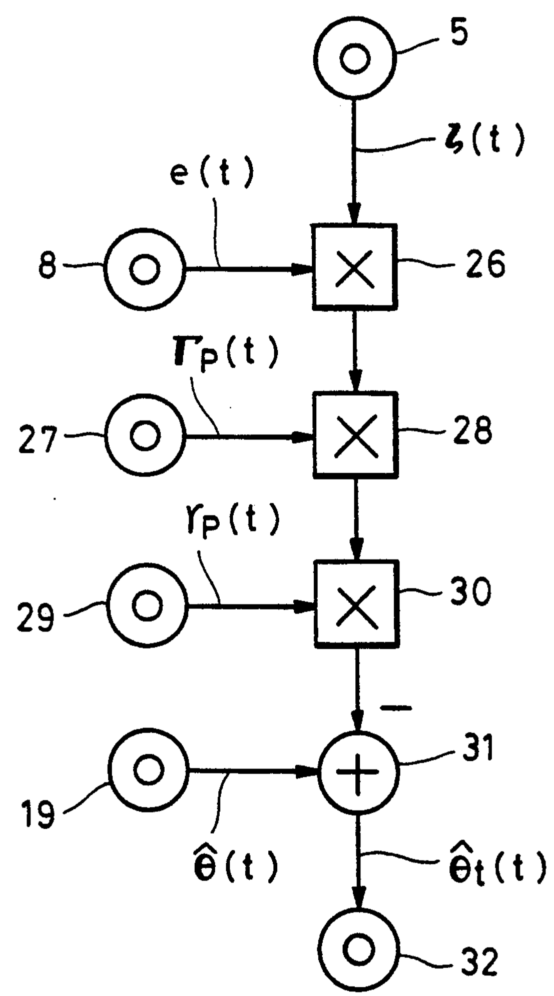
FIG. 5 is a block diagram of a mechanical unit for adjusting parameters in which proportional parameter adjustment is used together.

FIG. 5 shows a block circuit diagram of a mechanism which further adjusts and modifies system parameters proportionately in the parameter adjusting unit 2.

In FIG. 5, an adder 26 obtains a signal $\zeta(t)e(t)$ from $\zeta(t)$ and e(t). An input terminal 27 is for a matrix gain $\Gamma_P(t)$. A multiplier 28 obtains a signal $(\Gamma_P(t)\zeta(t)e(t))$ from $(\zeta(t)e(t))$ and $\Gamma_P(t)$. An input terminal 29 is for a scalar gain $\gamma_P(t)$. A multiplier 30 obtains a signal $(\gamma_P(t)\Gamma_P(t)\zeta(t)e(t))$ from $(\Gamma_P(t)\zeta(t)e(t))$ and $\gamma_P(t)$. An output from this multiplier is added to $\hat{\theta}(t)$ with its sign inverted in an adder 31, and the added signal is output to a terminal 32. To the output terminal 32, $\hat{\theta}_I(t)$ which is an estimation value of $\theta$ is output. The signal 0(t) which has been explained with reference to FIG. 3 is input to the terminal 19, and e(t) is input to the terminal 8.

A block circuit diagram for adjusting adjustable parameters $\hat{\theta}_P(t)$ and $\hat{\theta}_I(t)$ has now been shown. This can be mathematically expressed as follows.

$$\begin{aligned}\hat{\theta}_P(t) &= -\gamma_P(t)\Gamma_P(t)\zeta(t)e(t) \\ &= -\gamma_P(t)\Gamma_P(t)\zeta(t)(\zeta^T(t)\hat{\theta}(t) - s(t))\end{aligned} \tag{17}$$

$$\Gamma_P(t) > 0,\ \Gamma_P^{-1}(t) > 0 \tag{18}$$

$$0 < \gamma_P(t) \leqq \frac{2}{\zeta^T(t)\Gamma_P(t)\zeta(t)} \tag{19}$$

$$\hat{\theta}_I(t) = \hat{\theta}(t) + \hat{\theta}_P(t). \tag{20}$$

Although the range of the scalar gain $\gamma_P(t)$ shown in expression (19) is not shown in FIG. 5, it is necessary to define the gain $\gamma_P(t)$ within this range in order to obtain the effect of expression (31) which will be described later. Furthermore, if the gain $\gamma_P(t)$ is within this range, it is also possible to obtain the effect of expression (32), which will be described later, particularly when it is arranged so that $I_P(t)=I$ (I is a unit matrix).

In this case, the multiplier 28 shown in FIG. 4 becomes unnecessary.

Although e(t) has been adopted as a scalar error in the above description, parameters may also be adaptively adjusted using an error $\epsilon(t)$ corresponding to the following relationship:

$$\epsilon(t)=(1-\gamma_P(t)\zeta^T(t)\Gamma_P(t)\zeta(t))e(t) \tag{21}$$

In this case, a mechanism for adaptively adjusting parameters can be mathematically expressed as follows.

$$\dot{\hat{\theta}}(t) = -\frac{\lambda_2(t)\Gamma(t)\zeta(t)}{1-\gamma_P(t)\zeta^T(t)\Gamma_P(t)\zeta(t)}\epsilon(t) \tag{22}$$

$$\dot{\Gamma}(t) = \lambda_1(t)\Gamma(t) - \lambda_2(t)\Gamma(t)\zeta(t)\zeta^T(t)\Gamma(t) \tag{23}$$

$$\Gamma(0) > 0,\ \Gamma^{-1}(0) > 0 \tag{24}$$

$$0 \leqq \lambda_1(t) < \infty,\ 0 < \lambda_2(t) < \infty \tag{25}$$

$$\hat{\theta}_P(t) = -\frac{\gamma_P(t)\Gamma_P(t)\zeta(t)}{1-\gamma_P(t)\zeta^T(t)\Gamma_P(t)\zeta(t)}\epsilon(t) \tag{26}$$

$$\Gamma_P(t) > 0,\ \Gamma_P^{-1}(t) > 0 \tag{27}$$

$$0 < \gamma_P(t) \leqq \frac{2}{\zeta^T(t)\Gamma_P(t)\zeta(t)} \tag{28}$$

$$\hat{\theta}_I(t) = \hat{\theta}(t) + \hat{\theta}_P(t). \tag{29}$$

Also in the case of using expressions (22)-(29), it is possible to use the method as described above for the scaling of the scalar gain $\lambda_2(t)$. It is also possible to provide the matrix gain $\Gamma_P(t)$ in the form of a unit matrix. Furthermore, expression (10) and (17) may also be used in place of expressions (22) and (17), respectively. That is, e(t) and $\epsilon(t)$ may be used together.

The inventive method of adjusting a gain relative to the error equation expressed by expression (1) has been newly devised so as to minimize the evaluation function which is very significant from the viewpoint of engineering and is expressed by the following expression (30):

$$J(\psi(t)) = \int_0^t \exp\left(-\int_\tau^t \lambda_1(q)dq\right)\lambda_2(\tau)(\zeta^T(\tau)\psi(t))^2 d\tau. \tag{30}$$

According to the inventive method, it is possible to obtain an adjustable parameter $\hat{\theta}(t)$ which is most suitable from the viewpoint of engineering in that the evaluation function expressed in expression (30) is minimized. Since the scalar gain $\lambda_2(t)$ can be provided with a scaling function, it is possible to eliminate an influence of the amount of the vector signal $\zeta(t)$ on the adjustable parameter $\hat{\theta}(t)$ by operating this function.

For the error equation expressed by expression (5), the proportionately-adjusted $\hat{\theta}_P(t)$ is used together. According to the inventive method, it is possible to adjust the adjustable parameter $\hat{\theta}_I(t)$ so that the following relationship holds, that is, the error can be suppressed to a small value:

$$|\epsilon(t)| \leqq |e(t)| \tag{31}$$

In other words, there is performed parameter adjustment which is excellent from the view point of making the scalar error to a small value. Particularly when the matrix gain $\Gamma_p(t)$ in the proportional adjustment method is selected as a simple unit matrix, the following relationship is also obtained:

$$\|\hat{\theta}_f(t)-\theta\| < \|\hat{\theta}(t)-\theta\| \quad (32).$$

That is, an excellent convergent characteristic is also obtained in which the adaptively adjusted $\hat{\theta}_f(t)$ approaches the desirable parameter $\theta$ more closely than the parameter $\hat{\theta}(t)$. As an error signal for adaptively adjusting the parameters $\hat{\theta}(t)$ and $\hat{\theta}_f(t)$, whichever one of e(t) and $\epsilon(t)$ which is more convenient can be used. Hence, the degree of freedom in circuit configuration is increased, and it is possible to adopt a circuit configuration which is efficient from various viewpoints.

Furthermore, it is also possible to perform the adaptive adjustment of parameters shown in the above-described embodiment in a digital approach using software or hardware. In that case, differential equations are transformed into difference equations. The transformation can easily be performed, since various methods, such as the Euler method, the Runge-Kutta method and the like, have been known. In the case of using the Euler method, if time is divided into discrete values with a sampling time T and a sampling time t=kT is expressed by k for the purpose of simplification, expressions (10)–(13), for example, can easily be transformed as follows.

$$\hat{\theta}(k+1)=\hat{\theta}(k)-T\lambda_2(k)\Gamma(k)\zeta(k)e(k) \quad (10')$$

$$\Gamma(k+1)=(1+T\lambda_1(k))\Gamma(k)-T\lambda_2(k)\Gamma(k)\zeta(k)\zeta^T(k)\Gamma(k) \quad (11')$$

$$\Gamma(0)>0,\ \Gamma^{-1}(0)>0 \quad (12')$$

$$0\leq\lambda_1(k)<\infty,\ 0<\lambda_2(k)<\infty \quad (13').$$

Figure 6:
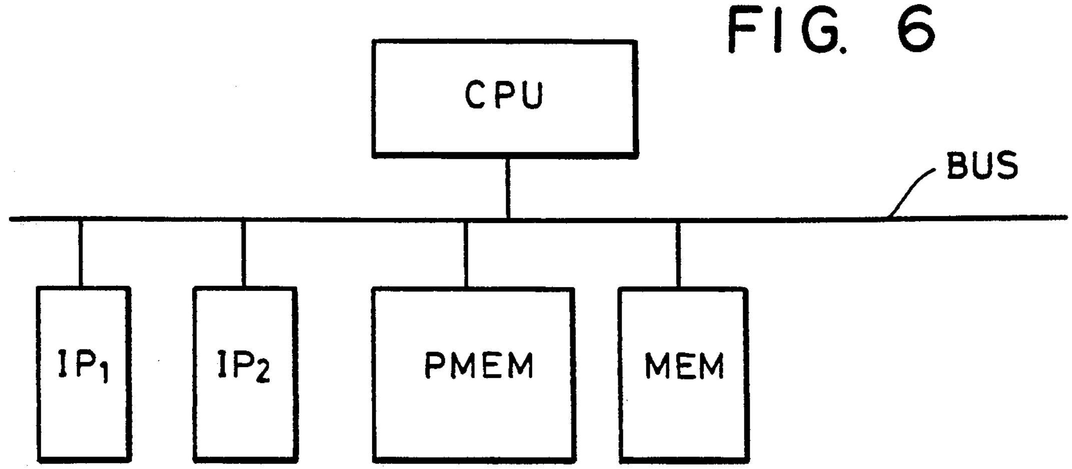
FIG. 6 is a block diagram of a parameter adjusting unit in another embodiment.

FIG. 6 is a block diagram showing the present embodiment. In FIG. 6, an input unit $IP_1$ outputs a signal which corresponds to a signal $\zeta(k)$. An input unit $IP_2$ outputs a signal which corresponds to a signal e(k). The signal e(k) is obtained by dividing time in the signal e(t) obtained by expression (1) from signals $\zeta(t)$, s(t) and $\hat{\theta}(t)$, which the external signal input processing unit receives, into discrete values.

Figure 7:
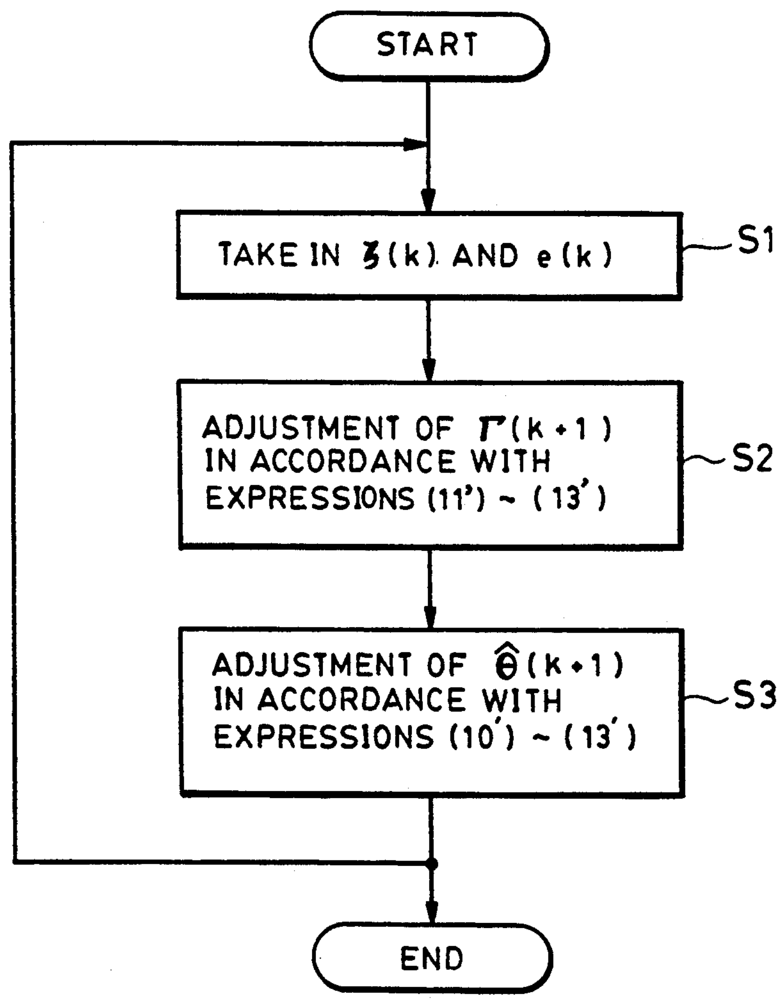
FIG. 7 is a flowchart for adjusting parameters in still another embodiment.

In FIG. 6, a processing procedure as shown in FIG. 7 is stored in a memory PMEM.

A memory MEM stores data which are taken in, processed and the like.

A processing unit CPU executes processing in accordance with the processing procedure stored in the memory PMEM.

FIG. 7 shows a flowchart in which the adaptive adjustment expressed in expressions (10')–(13') is performed using the signals $\zeta(k)$ and e(k) described above.

First, the vector signal $\zeta(k)$ and the scalar error e(k) are taken in at step S1. At step S2, the value of $\Gamma(k+1)$ is adjusted by the value obtained at step S1, a value when t=kT and the relationship expressed in expressions (11')–(13'), and the adjusted value is stored. At step S3, the value of $\hat{\theta}(k+1)$ is adjusted by the value obtained at step S1, a value when t=kT and expressions (10')–(13'), and the adjusted value is output.

Figure 8:
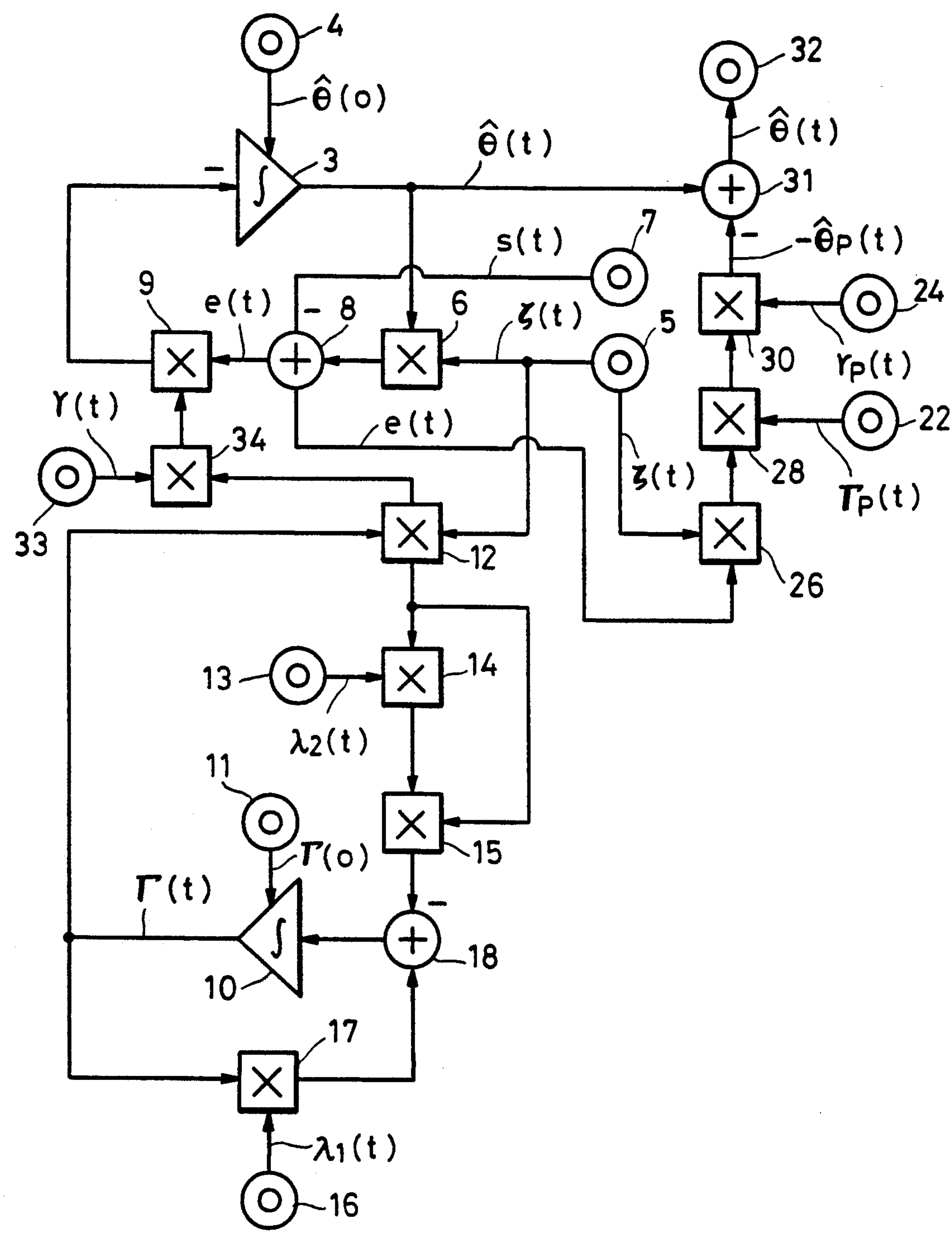
FIG. 8 is a block diagram of a mechanical unit for adjusting parameters in still another embodiment.

As another embodiment, an explanation will be provided of a method according to the block diagram shown in FIG. 8.

In the present embodiment, an integral relationship and a proportional relationship are used together. The present embodiment differs from the embodiment in accordance with FIGS. 3 and 5 in that, in the present embodiment, $\gamma(t)$ which is different from $\lambda_2(t)$ used for the adjustment of $\Gamma(t)$ is used as a scalar gain in the integral relationship.

In FIG. 8, an input terminal 33 inputs $\gamma(t)$, and a multiplier 34 multiplies $\gamma(t)$ by $\Gamma(t)\zeta(t)$.

When a parameter adjusting mechanism in accordance with FIG. 8 is mathematically expressed, expressions in the present embodiment differ from expressions (10)–(13) and (17)–(20), which correspond to FIGS. 3 and 5, respectively, in using the following expressions (33) and (34) in place of expressions (10) and (13).

$$\dot{\hat{\theta}}(t)=-\gamma(t)\Gamma(t)\zeta(t)e(t) \quad (33)$$

$$0\leq\lambda_1(t)<\infty,\ 0\leq\lambda_2(t)\leq2\gamma(t)<\infty \quad (34).$$

Although the condition expressed in expression (34) is not shown in the block diagram, it is a condition necessary for properly adjusting the adjustable parameter $\hat{\theta}_f(t)$.

Figure 9:
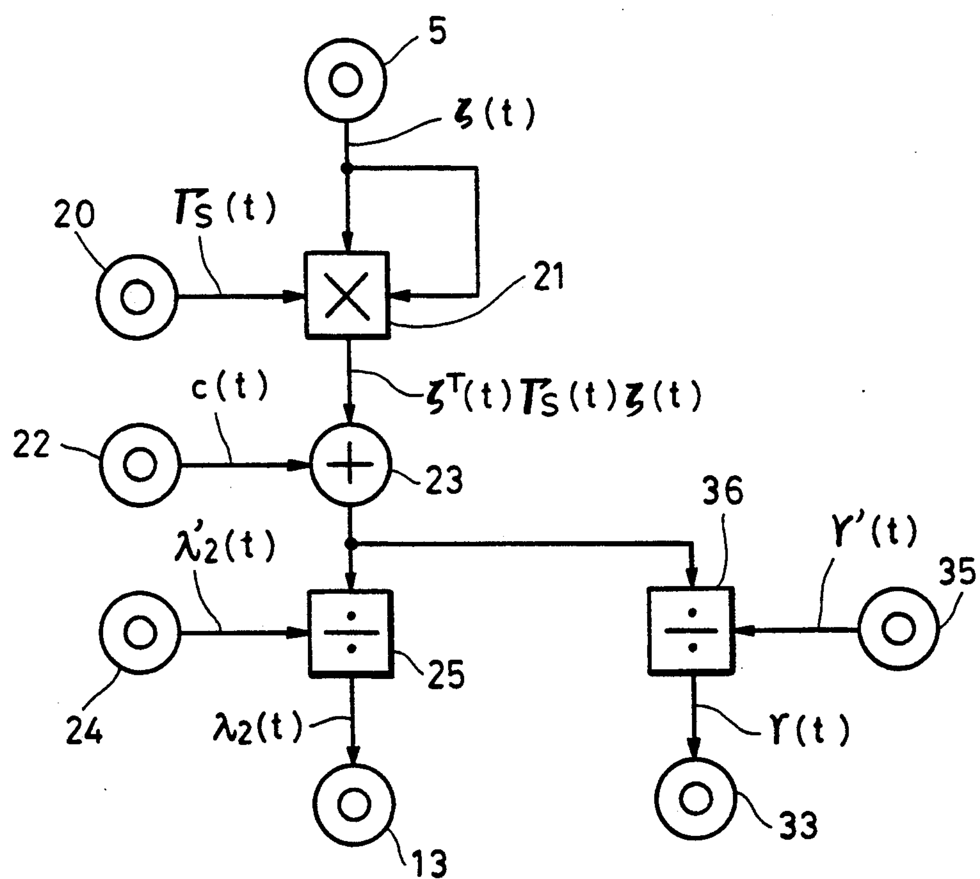
FIG. 9 is a block diagram of a circuit for scaling a scalar gain in still another embodiment.

FIG. 9 is a block circuit diagram showing a method of modification when the scaling of the scalar gain $\gamma(t)$ and the scalar coefficient $\lambda_2(t)$ shown in FIG. 8 is performed.

This circuit further performs the scaling of $\gamma(t)$ using the scaling circuit shown in FIG. 4. In FIG. 4, components which are identical to those in FIG. 4 are indicated by like numerals.

In FIG. 9, there is shown an input terminal 35 for a signal $\gamma'(t)$. A divider 36 obtains a scalar gain $\gamma(t)=\gamma'(t)/(c(t)+\zeta^T(t)\Gamma_s(t)\zeta(t)$ which is subjected to scaling from an output signal from the adder 23 and $\gamma'(t)$. The signal $\gamma(t)$ is output to an input terminal 33.

An explanation has now been provided of the block circuit diagram for the scaling of the scalar coefficient $\lambda_2(t)$ and the scalar gain $\gamma(t)$. This is mathematically expressed as follows.

$$\gamma(t)=\frac{\gamma'(t)}{C(t)+\zeta^T(t)\Gamma_s(t)\zeta(t)} \quad (35)$$

$$\lambda_2(t)=\frac{\lambda_2'(t)}{C(t)+\zeta^T(t)\Gamma_s(t)\zeta(t)} \quad (36)$$

$$0\leq\lambda_2'(t)\leq2\gamma'(t)<\infty \quad (37)$$

$$\Gamma_s(t)>0,\ \Gamma_s^{-1}(t)>0 \quad (38)$$

$$0\leq C(t)<\infty. \quad (39)$$

Although the conditions expressed in expressions (37)–(39) are not shown in the block diagram, these conditions are necessary for properly adjusting the adjustable parameter $\hat{\theta}_f(t)$. Furthermore, the circuit diagram for the scalings shown in expressions (35)–(39) is not limited to that shown in FIG. 9, but various other circuits may also be used, and the circuit in the present embodiment is only an example.

Next, an adaptive adjustment of parameters by the error $\epsilon(t)$ using the following expression will be considered:

$$\epsilon(t)=(1-\gamma_p(t)\zeta^T(t)\Gamma_p(t)\zeta(t))e(t) \quad (29).$$

In this case, a mechanism for adaptively adjusting parameters is mathematically expressed as follows:

$$\hat{\theta}(t) = -\frac{\gamma(t)\Gamma(t)\zeta(t)}{1 - \gamma_P(t)\zeta^T(t)\Gamma_P(t)\zeta(t)}\epsilon(t) \quad (40)$$

$$\dot{\Gamma}(t) = \lambda_1(t)\Gamma(t) - \lambda_2(t)\Gamma(t)\zeta(t)\zeta^T(t)\Gamma(t) \quad (41)$$

$$\Gamma(o) > 0, \Gamma^{-1}(o) > 0 \quad (42)$$

$$0 \leqq \lambda_1(t) < \infty, 0 \leqq \lambda_2(t) \leqq 2\gamma(t) < \infty \quad (43)$$

$$\hat{\theta}_P(t) = -\frac{\gamma_P(t)\Gamma_P(t)\zeta(t)}{1 - \gamma_P(t)\zeta^T(t)\Gamma_P(t)\zeta(t)}\epsilon(t) \quad (44)$$

$$\Gamma_P(t) > 0, \Gamma_P^{-1}(t) > 0 \quad (45)$$

$$0 < \gamma_P(t) = \frac{2}{\zeta^T(t)\Gamma_P(t)\zeta(t)} \quad (46)$$

$$\hat{\theta}_I(t) = \hat{\theta}(t) + \hat{\theta}_P(t). \quad (47)$$

Although it may appear that the adaptive adjustment of $\hat{\theta}(t)$ and $\hat{\theta}_P(t)$ using the error signal $\epsilon(t)$ shown in expressions (40)-(47) becomes more complicated than the adjustment using the error signal e(t), this is not necessarily true. As an example, an embodiment in which expressions (40)-(47) are further transformed will now be shown.

In an example in which the scalar gains $\gamma(t)$ and $\gamma_P(t)$ are selected as by the following expressions:

$$\gamma(t) = \frac{\gamma'(t)}{1 + \zeta^T(t)\Gamma_P(t)\zeta(t)} \quad (48)$$

$$\gamma_P(t) = \frac{1}{1 + \zeta^T(t)\Gamma_P(t)\zeta(t)}, \quad (49)$$

expressions (40)-(47) are expressed as follows:

$$\dot{\hat{\theta}}(t) = -\gamma'(t)\Gamma(t)\zeta(t)\epsilon(t) \quad (50)$$

$$\dot{\Gamma}(t) = \lambda_1(t)\Gamma(t) - \frac{\lambda_2(t)\Gamma(t)\zeta(t)\zeta^T(t)V(t)}{1 + \zeta^T(t)\Gamma_P(t)\zeta(t)} \quad (51)$$

$$\Gamma(o)>0, \Gamma^{-1}(o)>0 \quad (52)$$

$$0 \leqq \lambda_1(t) < \infty, 0 \leqq \lambda_2'(t) \leqq 2\gamma'(t) < \infty \quad (53)$$

$$\theta_p(t) = -\Gamma_p(t)\zeta(t)\epsilon(t) \quad (54)$$

$$\Gamma_p(t)>0, \Gamma_p^{-1}(t)>0 \quad (55).$$

As is apparent from expressions (50) and (54), when the scalar gains $\gamma(t)$ and $\gamma_P(t)$ by the expressions (48) and (49), for example, are selected, a more compact circuit configuration can be provided when $\epsilon(t)$ is used in place of e(t) as the error signal.

As another example, when the scalar gain $\gamma_P(t)$ having a proportional relationship is selected particularly by the following expression (56):

$$\gamma_P(t) = \frac{1}{\zeta^T(t)\Gamma_P(t)\zeta(t)}, \quad (56)$$

the property shown in expression (7) which is an important property of an adjustment method can be obtained directly from expression (21). That is, it is possible to obtain the following characteristic:

$$\epsilon(t)=0; \quad (57).$$

Although, in the present embodiment, there is shown an example in which the error signal $\epsilon(t)$ is used for the adjustment of $\hat{\theta}(t)$ and $\hat{\theta}_P(t)$, the error signals e(t) and $\epsilon(t)$ may be mixed such that e(t) and $\epsilon(t)$ are used for $\hat{\theta}(t)$ and $\hat{\theta}_P(t)$, respectively.

On the other hand, it is also possible to perform the adaptive adjustment of parameters shown in expressions (11), (12) and (17)-(20), (33) and (34) digitally by software and hardware. As explained relative to expressions (10')-(13'), also in this case, differential equations are transformed into difference equations. If time is divided into discrete values with a sampling time T and the sampling time t=kT is expressed by k for the purpose of simplification, as in the above-described case, the respective expressions described above are easily transformed as follows:

$$\hat{\theta}(k+1) = \hat{\theta}(k) - T\gamma(k)\Gamma(t)\zeta(t)e(t) \quad (33')$$

$$\Gamma(k+1) = (1 + T\lambda_1(k)\Gamma(k) - T\lambda_2(k)\Gamma(k)\zeta(k)\zeta^T(k)\Gamma(k) \quad (11')$$

$$\Gamma(o)<0, \Gamma^{-1}(o)<0 \quad (12')$$

$$0 \leqq \lambda_1(k) < \infty, 0 \leqq \lambda_2(k) \leqq 2\gamma(k) < \infty \quad (34')$$

$$\hat{\theta}_P(k) = -\gamma_P(k)\Gamma_P(k)\zeta(k)e(k) \quad (17')$$

$$\Gamma_P(k)>0, \Gamma_P^{-1}(k)>0 \quad (18')$$

$$0 < \gamma_P(k) \leqq \frac{2}{\zeta^T(k)\Gamma_P(k)\zeta(k)} \quad (19')$$

$$\hat{\theta}_I(k) = \hat{\theta}(k) + \hat{\theta}_P(k) \quad (20')$$

Figure 10:
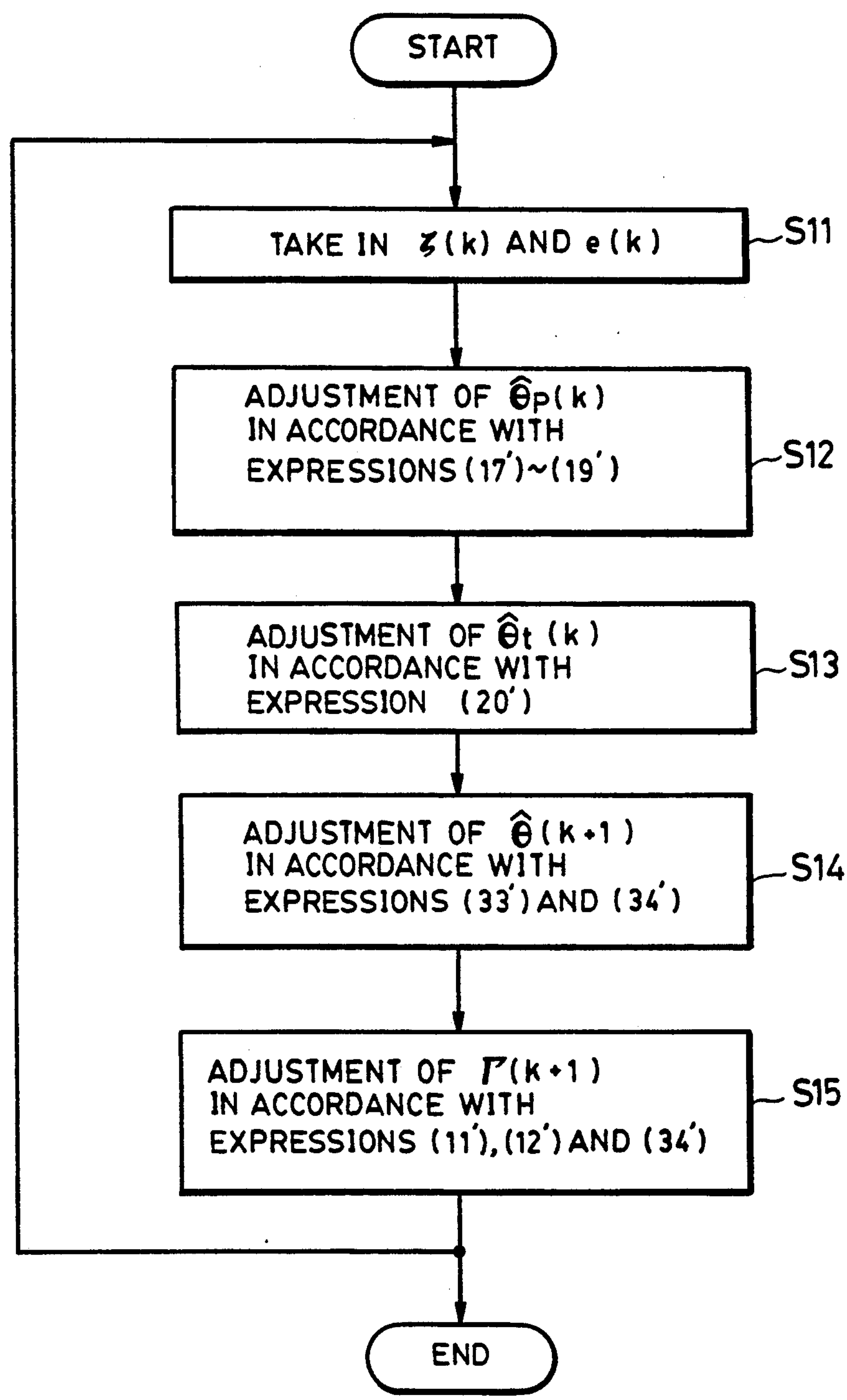
FIG. 10 is a flowchart for adjusting parameters in still another embodiment.

An explanation will now be provided of a method in which the processing realized by wired logic in FIG. 8 is performed by a program processing by the apparatus shown in FIG. 6. It is to be noted that, in FIG. 6, the processing procedure shown in FIG. 10 is stored in the memory PMEM.

Next, the operation will be explained with reference to FIG. 10.

First, the value of $\zeta(k)e(k)$ is taken in from the input units $IP_1$ and $IP_2$, and stored in the memory MEM (step S11). An operation processing for obtaining $\hat{\theta}_P(k)$ is then performed by the processing unit CPU, and the operated result is stored in the memory MEM (step S12).

An operation for obtaining $\hat{\theta}_I(k)$ is then performed. The operated result is stored in the memory MEM, and is further sent to the processing unit 2 (step S13). The value of $\theta(k+1)$ is then similarly processed and stored (step S14). Furthermore, the value of $\Gamma(k+1)$ is processed and stored (step S15).

Although, in the above-described example, the entire process is subjected to program processing, only a part of the process may be performed by program processing.

The performance of an adaptive system largely depends on the performance of a parameter adjusting unit having the role of adaptively adjusting system parameters. In the adaptive system of the present invention, since it is possible to configure a parameter adjusting unit having the novel and excellent effects as described below, an adaptive system having a high performance which has not existed before can be constructed.

(a) A high adaptive property can be obtained in the adjustment of system parameters which are adaptively adjusted.

(b) A proportional parameter adjusting method can be used in combination, and it is therefore possible to improve the adjustment of system parameters so that scalar errors become further smaller.

(c) When system parameters are adjusted in accordance with an integral relationship, one or both of a scalar and a matrix can be selected for the gains, which have an important role in the adjustment of system parameters. Furthermore, when the adjustment in accordance with a proportional relationship is used in combination, one or both of a scalar and a matrix can also be selected for the gains independently from the adjustment of system parameters in accordance with the integral relationship. Hence, it becomes possible to use a gain method which fits the characteristic of a system.

(d) The scaling of scalar gains and scalar coefficients is possible. Hence, even when the level of signals used in adjusting parameters fluctuates, it is possible to eliminate the influence of the fluctuation. That is, it becomes possible to adaptively and properly determine system parameters irrespective of fluctuation in the level of signals.

(e) When a proportional parameter adjusting mechanism is used in combination, it becomes possible to adjust system parameters in a further improved manner by selecting their matrix gain as a unit matrix.

(f) It is possible to use two kinds of scalar errors required for the adaptive adjustment of system parameters, and it becomes thereby possible to provide various efficient configurations.

What is claimed is:

1. An adaptive apparatus for processing a signal on the basis of a system parameter adjusted in an adaptive manner, comprising:

adaptive processing means for performing an adaptive processing of an input signal from a system and controlling the system by outputting an output signal obtained through the adaptive processing to the system;

first input means for inputting both the input and the output signals of said adaptive processing means first signal generating means for generating a first signal in a form of a vector from the input signal and the output signal;

second signal generating means for generating a second signal in a form of a scaler from the input signal and the output signal;

deriving means for deriving an error signal from the first signal, the second signal, and a preceding value of the system parameter;

second input means for inputting a third signal in a form of a scaler;

gain input means for inputting a first gain in a form of a scaler function employing time as a variable;

gain generating means for generating a second gain, in a form of a matrix function employing time as a variable, from the first signal, the third signal, the first gain and a feedback output of the gain generating means;

adjustment means for estimating the system parameter by integrating a product of the first gain, the second gain, the first signal and the error signal, and adjusting the system parameter to the estimate thereof; and outputting means for outputting the adjusted system parameter to the adaptive processing means, the adaptive processing means performing the adaptive processing in response to the adjusted system parameter received from the outputting means.

2. An adaptive apparatus according to claim 1, further comprising scaling means for altering a scale of the first gain.

3. An adaptive apparatus for processing a signal on the basis of a system parameter adjusted in an adaptive manner, comprising:

adaptive processing means for preforming an adaptive processing of an input signal from a system and controlling the system by outputting an output signal obtained through the adaptive processing the system;

first input means for inputting both the input and the output signals of said adaptive processing means;

first signal generating means for generating a first signal in a form of a vector from the input signal and the output signal;

second signal generating means for generating a second signal in a form of a scaler from the input signal and the output signal; and the second estimates thereof and adjusting the system parameter to the third estimate of the system parameter; and outputting means for outputting the adjusted system parameter to the adaptive processing means, the adaptive processing means performing the adaptive processing in response to the adjusted system parameter received from the outputting means.

4. An adaptive apparatus according to claim 3, further comprising scaling means for altering a scale of the first gain.

5. An adaptive apparatus according to claim 3, wherein said deriving means uses the first estimate of the system parameter as the preceding value of the system parameter.

6. An adaptive apparatus according to claim 3, wherein said deriving means uses the third estimate of the system parameter as the preceding value of the system parameter.

7. An adaptive apparatus according to claim 3, further comprising third gain input means for inputting a fourth gain in a form of a matrix function employing time as a variable, and wherein said second estimating means obtains the second estimate of the system parameter by multiplying the third gain, the fourth gain, the first signal and the error signal.

8. An adaptive apparatus for for processing a signal on the basis of a system parameter adjusted in an adaptive manner, comprising:

adaptive processing means for performing an adaptive processing of an input signal from a system and controlling the system by outputting an output signal obtained through the adaptive processing to the system;

first input means for inputting both the input and the output signal of said adaptive processing means;

first signal generating means for generating a first signal in a form of a vector from the input signal and the output signal;

second signal generating means for generating a second signal in a form of a scaler from the input signal and the output signal;

deriving means for deriving an error signal from the first signal, the second signal, and a preceding value of the system parameter;

second input means for inputting a third signal in a form of a scaler;

third input means for inputting a fourth signal in a form of a scaler first gain input means for inputting a first gain in a form of a scaler function employing time as a variable;

gain generating means for generating a second gain, in a form of a matrix function employing time as a variable, from the first signal, the third signal, the fourth signal and a feedback output of the gain generating means;

first estimating means for obtaining a first estimate of the system parameter by integrating a product of the first gain, the second gain, the first signal and the error signal;

second gain input means for inputting a third gain in a form of a scaler function employing time as a variable;

third gain input means for inputting a fourth gain in a form of a matrix function employing time as a variable;

second estimating means for obtaining a second estimate of the system parameter by multiplying the third gain, the fourth gain, the first signal and the error signal;

adjustment means for obtaining a third estimate of the system parameter by adding the first and the second estimates thereof and adjusting the system parameter to the third estimate of the system parameter; and outputting means for outputting the adjusted system parameter to the adaptive processing means, the adaptive processing means performing the adaptive processing in response to the adjusted system parameter received from the outputting means.

9. An adaptive apparatus according to claim 8, further comprising scaling means for altering a scale of the first gain.

10. An adaptive apparatus according to claim 8, further comprising scaling means for altering a scale of the second signal.

* * * * *

UNITED STATES PATENT AND TRADEMARK OFFICE

CERTIFICATE OF CORRECTION

PATENT NO. : 5,305,193

DATED : April 19, 1994

INVENTOR(S) : SHINJI SHINNAKA ET AL.

It is certified that error appears in the above-identified patent and that said Letters Patent is hereby corrected as shown below:

COLUMN 1

Line 10, "There" should read --there--.

COLUMN 2

Line 23, "an" should read --a--.

COLUMN 4

Line 2, "system" should read --system and--.

COLUMN 5

Line 45, "signal O(t)" should read --signal θ(t)--.

COLUMN 6

Line 34, "expression (10)" should read --expressions (10)--.
Line 67, "view point" should read --viewpoint--.

COLUMN 8

Line 29, "FIG. 4," should read --FIG. 9,--.
Line 65, "(29)." should read --(29')--.

UNITED STATES PATENT AND TRADEMARK OFFICE
CERTIFICATE OF CORRECTION

PATENT NO. : 5,305,193

DATED : April 19, 1994

INVENTOR(S) : SHINJI SHINNAKA ET AL.

It is certified that error appears in the above-identified patent and that said Letters Patent is hereby corrected as shown below:

COLUMN 9

Line 39, "$\lambda_2(t)$" should read --$\lambda_2'(t)$--.
Line 67, "$\epsilon(t)=0;$" should read --$\epsilon(t)=0 \quad ;\forall t$--.

COLUMN 10

Line 22, "$\Gamma(o)<0,\ \Gamma^{-1}(o)<0 \quad (12')$"
should read
--$\Gamma(o)>0,\ \Gamma^{-1}(o)>0 \quad (12')$--.

COLUMN 11

Line 44, "means" should read --means;--.
Line 49, "scaler" should read --scalar--.
Line 56, "scaler;" should read --scalar;--.
Line 58, "scaler" should read --scalar--.

COLUMN 12

Line 15, "processing" should read --processing of--.
Line 23, "scaler" should read --scalar--.
Line 24, "signal; and" should read --signal;

deriving means for deriving an error signal from the first signal, the second signal, and a preceding value of the system parameter;

second input means for inputting a third signal in a form of a scalar;

first gain input means for inputting a first gain in a form of a scalar function employing time as a variable;

UNITED STATES PATENT AND TRADEMARK OFFICE
CERTIFICATE OF CORRECTION

PATENT NO. : 5,305,193

DATED : April 19, 1994

INVENTOR(S) : SHINJI SHINNAKA ET AL.

It is certified that error appears in the above-identified patent and that said Letters Patent is hereby corrected as shown below:

COLUMN 12

Line 24, continued, gain generating means for generating a second gain, in a form of a matrix function employing time as a variable, from the first signal, the third signal, the first gain and a feedback output of the gain generating means;

first estimating means for obtaining a first estimate of the system parameter by integrating a product of the first gain, the second gain, the first signal and the error signal;

second gain input means for inputting a third gain in a form of a scalar function employing time as a variable;

second estimating means for obtaining a second estimate of the system parameter by multiplying the third gain, the first signal and the error signal;

adjustment means for obtaining a third estimate of the system parameter by adding the first and--.

Line 50, "for for" should read --for--.

Line 64, "scaler" should read --scalar;--.

UNITED STATES PATENT AND TRADEMARK OFFICE

CERTIFICATE OF CORRECTION

PATENT NO. : 5,305,193

DATED : April 19, 1994

INVENTOR(S) : SHINJI SHINNAKA ET AL.

It is certified that error appears in the above-identified patent and that said Letters Patent is hereby corrected as shown below:

COLUMN 13

Line 2, "scaler;" should read --scalar;--.
Line 5, "scaler" should read --scalar;--.
Line 7, "scaler" should read --scalar--.
Line 23, "scaler" should read --scalar--.

Signed and Sealed this

Eighth Day of November, 1994

Attest:

BRUCE LEHMAN

*Attesting Officer*

*Commissioner of Patents and Trademarks*